US006926218B2

(12) United States Patent
Perrin

(10) Patent No.: US 6,926,218 B2
(45) Date of Patent: Aug. 9, 2005

(54) FIXED SPOOL FISHING REEL

(76) Inventor: Dennis Perrin, 25 Adelaide Road, Bramhall, Stockport, Cheshire (GB), SK7 1NR (*) Notice: Subject to any disclaimer, the term of this patent is extended or adjusted under 35 U.S.C. 154(b) by 16 days.

(21) Appl. No.: 10/461,937

(22) Filed: Jun. 13, 2003

(65) Prior Publication Data

US 2003/0213862 A1 Nov. 20, 2003

Related U.S. Application Data

(63) Continuation of application No. PCT/GB01/05560, filed on Dec. 14, 2001.

(30) Foreign Application Priority Data

Dec. 16, 2000 (GB) ............................................ 0030748

(51) Int. Cl.[7] ................................................ A01K 89/15
(52) U.S. Cl. ........................ 242/323; 242/322; 242/319
(58) Field of Search ................................. 242/322, 323, 242/319

(56) References Cited

U.S. PATENT DOCUMENTS 5,333,813 A * 8/1994 Hirano ....................... 242/322
6,045,077 A * 4/2000 Bernard et al. ............. 242/314
6,648,258 B2 * 11/2003 Ochiai ........................ 242/323
6,655,622 B2 * 12/2003 Kitajima et al. ............ 242/322
2002/0053618 A1 * 5/2002 Ochiai ........................ 242/323

FOREIGN PATENT DOCUMENTS

EP 0164295 A * 12/1995
FR 2736478 A * 11/1998

* cited by examiner

*Primary Examiner*—Emmanuel Marcelo
*Assistant Examiner*—Evan H Langdon
(74) *Attorney, Agent, or Firm*—Gauthier & Connors LLP

(57) ABSTRACT

There is disclosed a fixed spool fishing reel having a spool holder and a winding mechanism including a rotary bail arm, and a spool having a spool portion on which the line is wound with a skirt portion of larger diameter than the spool portion, the spool portion having, or the skirt portion having on its rim adjacent the spool portion, a pommel over which a loop of line from the spool can be trained to be retained thereon, when it is pulled axially at the end of a cast, to check the cast but to be automatically released therefrom as a result of a pull on the line rotating the spool and/or the bail arm to alter the angular deviation of the line around the pommel.

4 Claims, 2 Drawing Sheets

18b
24
23
21
22

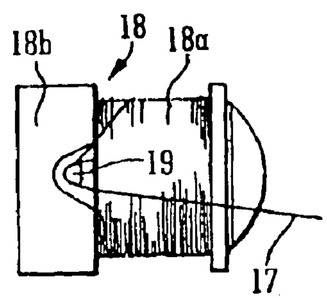
FIG. 2
PRIOR ART
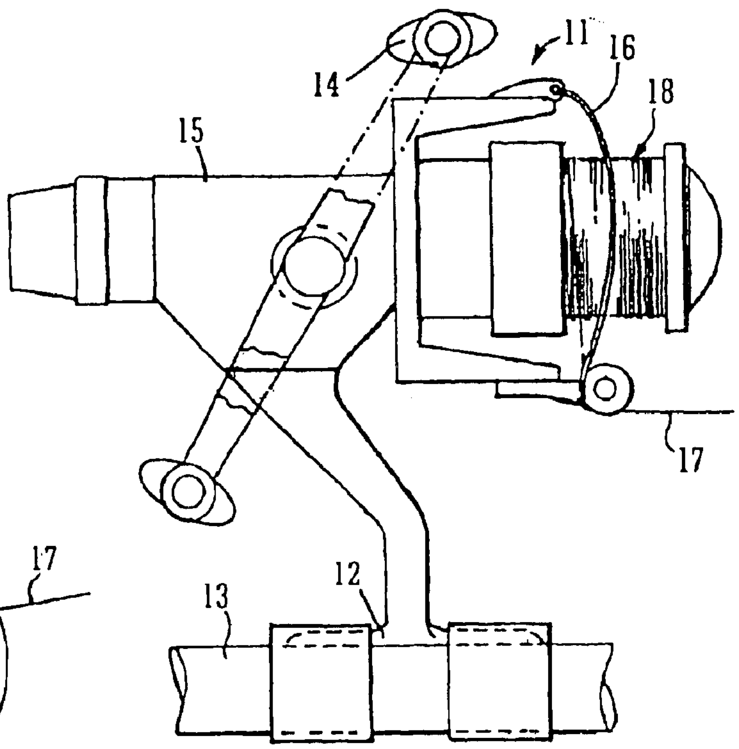
FIG. 1
PRIOR ART
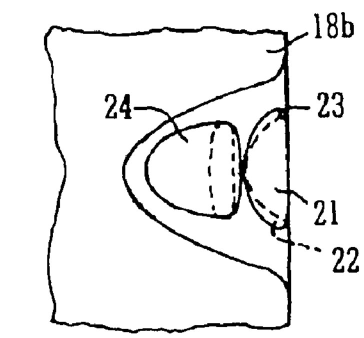
FIG. 3
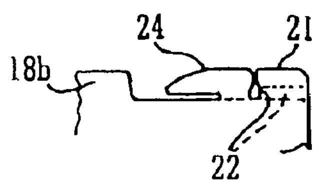
FIG. 6
FIG. 7

FIXED SPOOL FISHING REEL

This application is a continuation of PCT/GB01/05560 filed Dec. 14, 2001.

This invention relates to fixed spool fishing reels.

Conventional such reels have a spool holder and a winding mechanism including a rotary bail arm, and a spool, usually interchangeable, having a spool portion, on which the line is wound, with a skirt portion of larger diameter than the spool portion and which serves to mount the spool in the reel.

The skirt portion in most designs of fixed spool reel has a line retaining clip, this being situated on the rim of the skirt portion adjacent the spool portion. Its intended purpose is to hold the end of the line, when the spool is not being used, and prevent the line from unravelling.

When fishing using a rod fitted with a fixed spool reel it is desirable or even essential to limit the distance that the bait is propelled when casting.

A common method is to find an optimum position by casting short of the target and estimating a further amount of line that could be payed out safely. The angler then secures the line on the spool with an elastic band or similar or to use the line clip (usually fitted on a fixed spool reel). The line is wound back on to the reel and recast towards the target area, this time the cast is limited by the securing means but a further amount of line may be required to reach the target spot. This entails removing the tether, paying out more line and resecuring it to the spool. This process may have to be repeated several times.

The use of an elastic is labourious and it does not stand up to repeated casting, it can also interfere with the windings on the spool.

The use of the line clip is more convenient but in general it is not designed for this purpose (it is to secure the end of the line to prevent the line coming off the spool when not in use). In practice it is difficult to hook the line under and because of the pressure exerted by the clip it causes line damage; this is made worse when it is used as a casting limiter by the "snatch" which occurs as the line reaches this limit. It can be disastrous if a fish surges as it acts as a solid stop that can cut through the line. In any event, line damage is intolerable.

The present invention provides a means for securing a loop of line for the purpose of target casting that is more convenient to use than the elastic band or conventional line clip, and which does not cause any damage to the line.

The invention comprises a fixed spool fishing reel having a spool holder and a winding mechanism including a rotary bail arm, and a spool having a spool portion on which the line is wound with a skirt portion of larger diameter than the spool portion, the spool portion having, or the skirt portion having on its rim adjacent to the spool portion, a pommel over which a loop of line from the spool can be trained to be retained thereon when it is pulled axially at the end of a cast, to check the cast, but to be automatically released therefrom as a result of a pull on the line rotating the spool and/or the bail arm to alter the angular deviation of the line around the pommel.

The pommel may have a shallow undercut—as compared to the deep undercut of the conventional line retention clip—and a line exit portion that has a surface which guides the line out of the undercut as the exiting line is pulled towards the axial direction of the spool.

The pommel may have an associated line retainer of flexible construction.

A plurality of pommels may be spaced around the spool.

One embodiment of a reel according to the invention will now be described with regard to the accompanying drawings in which:

FIG. 1 is a view of a fixed spool reel of the kind to which the invention relates;

FIG. 2 is a view of a spool with a conventional line retaining clip;

FIG. 3 is a view of a spool with a pommel according to the invention;

FIG. 6 is a face on view of the pommel, to a larger scale;

FIG. 7 is a side view of the pommel of FIG. 6;

Figure 4:
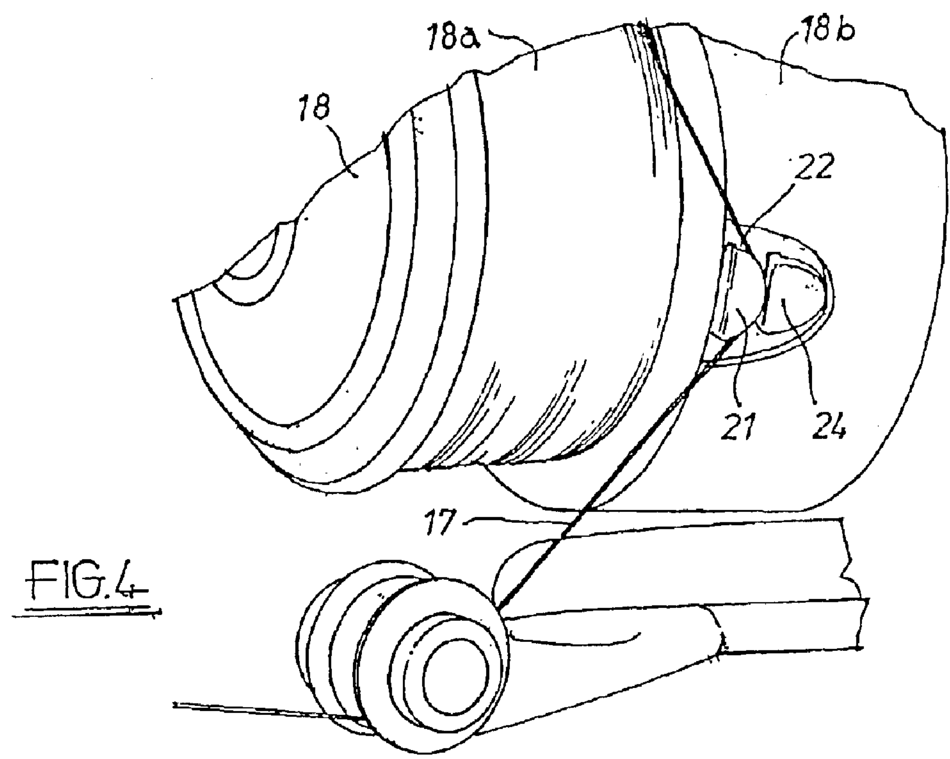
FIG. 4 is a view of the spool of FIG. 3 in a line-retaining situation.

The drawings illustrate a fixed spool fishing reel 11 having a foot 12 by which it is secured to the butt of a rod 13. The reel 11 has a winding mechanism comprising a winding handle 14 and a gearbox 15 by which a bail arm 16 is rotated which winds the line 17 on to a spool 18 and which can be set to an "off" position to allow the line to run freely overend the spool 18 for casting. Although termed "fixed spool", the spool 18 is actually able to rotate freely or against an adjustable drag, or be locked against rotation, the mode being set by controls on the reel.

The spool 18 is removable, so that a different spool, with a different weight of line, can be substituted. FIG. 2 shows a conventional spool 18 comprising a spool portion 18*a* on which the line 17 is wound and a skirt portion 18*b* by which it is mounted in the reel 11. The skirt portion 18*b* has a line retaining clip 19 on its rim adjacent the spool portion 18*a*. The line 17 is shown retained in this clip, which is intended to hold the end of the line, when the spool is not in use, against the line 17 unravelling.

This clip 19 is sometimes used by anglers for target casting. In order accurately to hit a selected spot, the angler limits the cast by means of a tether at the appropriate line location on the reel. The clip 19 is used as the tether, but it is not really suitable—it has not been designed for this purpose—as it can damage the line, and damaged line means lost catches.

The invention replaces the clip 19 with a pommel 21 as seen in FIG. 3, and as shown in more detail in FIGS. 6 and 7. The pommel 21 has a shallow undercut 22 and a line exit portion 23 that has a surface which guides the line 17 out of the undercut portion 22 as the exiting line is pulled towards the axial direction of the spool 18.

Figure 5:
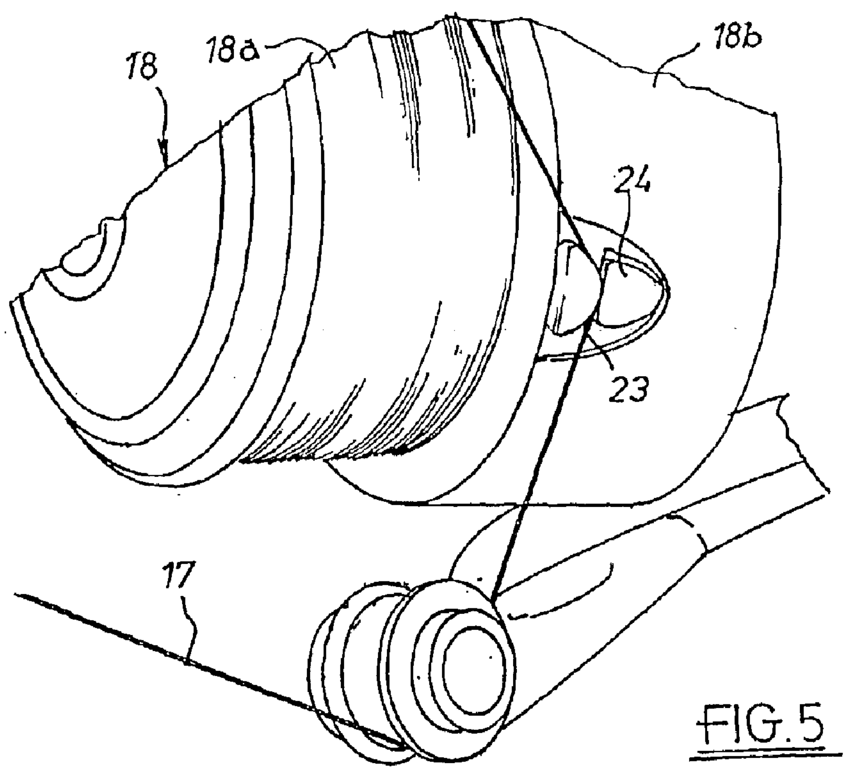
FIG. 5 is a view like FIG. 4, with the line about to be released from the pommel.

This action is best illustrated in FIGS. 3, 4 and 5. In the situation of FIG. 3, where a loop 17*a* of line 17 from the spool 18 is trained over the pommel 21, the situation being at the end of a cast, when the line 17 is being pulled axially off the spool. In this situation, the line 17 is caught on the pommel and no further line can escape.

In the position of FIG. 4, the line is trained over the pommel 21 and the roller of the bail arm 16. As the bail arm 16 and the pommel 21 move relatively to the position of FIG. 5, the angle of the line 17 on the pommel 21 changes so as to slip it off the pommel—this can allow a fish to run with the bait, without risking damage to the line.

A rubber or spring plastics material line retainer 24 holds the line 17 against accidentally falling out from engagement with the pommel.

The pommel 21 can thus be used exactly as the prior art line retaining clip 19 is used—or, rather, misused—without the attendant disadvantages of line damage or breakage.

A line retaining clip 19 can still, of course, be provided—the pommel 21 may be fabricated on top of it.

The pommel arrangement may be moulded in or machined out of the rim of the spool 18.

On some reels, the spool and skirt are separate—on such reels, the pommel can be arranged on the skirt portion exactly as if it was integral with the spool, or, of course, on the rim of the spool itself.

In practice, as the spool of line rotates towards the position of the bale arm roller, the tether is released some distance before the bale arm roller becomes aligned with the tether.

Because of the curved nature of the tether no damage to the line takes place even with continuous casting of heavy weights or feeders, etc.

A plurality of pommels may, of course, be arranged around the spool.

The tether may be adapted for use on left or right hand wind reels, or alternatively, for use equally on both, and because of its rugged construction it can be used with heavy breaking strain lines as well as light breaking strain line.

Chromium plating or similar plating may help to reduce friction on the tether.

An electronic indication may also be of assistance to the angler to indicate that the tether has been released.

What is claimed is:

1. A fixed spool fishing reel having a spool holder and a winding mechanism including a rotary bail arm, and a spool having a spool portion upon which the line is wound with a skirt portion of larger diameter than the spool portion, the spool portion having, or the skirt portion having on its rim adjacent the spool portion, a pommel around which a loop of line from the spool may pass to be retained thereon when it is pulled axially at the end of a cast, to check the cast, the pommel being configured to present a line exit portion having a surface which smoothly guides the line over the pommel to be automatically slipped off the pommel as the bail arm and pommel approach a position of radial alignment during rotation of the spool and/or the bail arm to alter the angular deviation of the line around the pommel.

2. A reel according to claim 1, in which the pommel has a shallow undercut and a line exit portion that has a surface which guides the line out of the undercut portion as the angular deviation changes.

3. A reel according to claim 2, in which the pommel has an associated line retainer of flexible construction.

4. A reel according to claim 1, having a plurality of pommels spaced around the spool.

* * * * *

UNITED STATES PATENT AND TRADEMARK OFFICE

CERTIFICATE OF CORRECTION

PATENT NO. : 6,926,218 B2
DATED : August 9, 2005
INVENTOR(S) : Dennis Perrin

It is certified that error appears in the above-identified patent and that said Letters Patent is hereby corrected as shown below:

Column 4,
Line 9, remove "around" and insert -- over --.
Line 12, after "present" insert -- only curved line-contacting surfaces to support the retained line thereon, untrapped by the pommel, thus to prevent damage to the retained line, and --.

Signed and Sealed this

Fourteenth Day of February, 2006

JON W. DUDAS
*Director of the United States Patent and Trademark Office*